United States Patent [19]

Fair, Sr.

[11] 4,416,718

[45] Nov. 22, 1983

[54] PROCESS FOR SPLITTING SHEET

[75] Inventor: Timothy K. Fair, Sr., Blaine, Minn.

[73] Assignee: Conwed Corporation, St. Paul, Minn.

[21] Appl. No.: 314,712

[22] Filed: Oct. 26, 1981

[51] Int. Cl.$^3$ ........ B32B 31/18

[52] U.S. Cl. ........ 156/344; 156/254; 156/584; 264/164; 264/DIG. 81

[58] Field of Search ........ 264/160, 157, 164, 165; 156/254, 584, 344; 425/223, 363, 201

[56] References Cited

U.S. PATENT DOCUMENTS

| | | | |
|---|---|---|---|
| 2,543,307 | 2/1951 | Swallow et al. | 425/201 |
| 3,140,511 | 7/1964 | Seufert et al. | 425/363 |
| 3,147,173 | 9/1964 | Zolkin et al. | 425/223 |
| 3,179,317 | 4/1965 | Voelker | 156/254 |
| 3,434,861 | 3/1969 | Luc | 156/254 |
| 3,469,960 | 9/1969 | Putzig | 264/164 |
| 3,741,702 | 6/1973 | Mazzoni | 425/363 |
| 3,770,554 | 11/1973 | Jones et al. | 156/584 |
| 3,814,791 | 6/1974 | Jones | 264/164 |
| 3,919,446 | 11/1975 | Smareok | 264/164 |
| 4,097,383 | 6/1978 | Ohtani et al. | 156/254 |
| 4,235,946 | 11/1980 | Lauchenauev | 264/164 |

FOREIGN PATENT DOCUMENTS 2065469 7/1971 France .

*Primary Examiner*—Jay H. Woo

*Attorney, Agent, or Firm*—Eyre, Mann, Lucas & Just

[57] ABSTRACT

The invention relates to a process and apparatus for making a thermoplastic polymer sheet and particularly a thermoplastic polymer netting structure. It further relates to a process and apparatus for splitting a thermoplastic polymer sheet or net structure so as to divide the sheet or net at the center thereof into two thin sheets. According to the invention, a previously formed plastic sheet or netting structure is reheated and then placed between two opposed heated smooth surfaces such as metal rolls. The sheet or net is heated to a temperature within the range of temperatures wherein the adhesion of the resin forming the sheet to the metal rolls is good and where its cohesion is poor. The opposed faces of the sheet or net structure adhere to the heated smooth surfaces. The opposed heated surfaces are separated; this causes the sheet or net to split in half to follow each surface. The split halves are quick-cooled to a temperature in the temperature range in which the resin's cohesion is increased and adhesion to the rolls is reduced so that the split sheet halves can be removed from the smooth roll surface.

7 Claims, 1 Drawing Figure

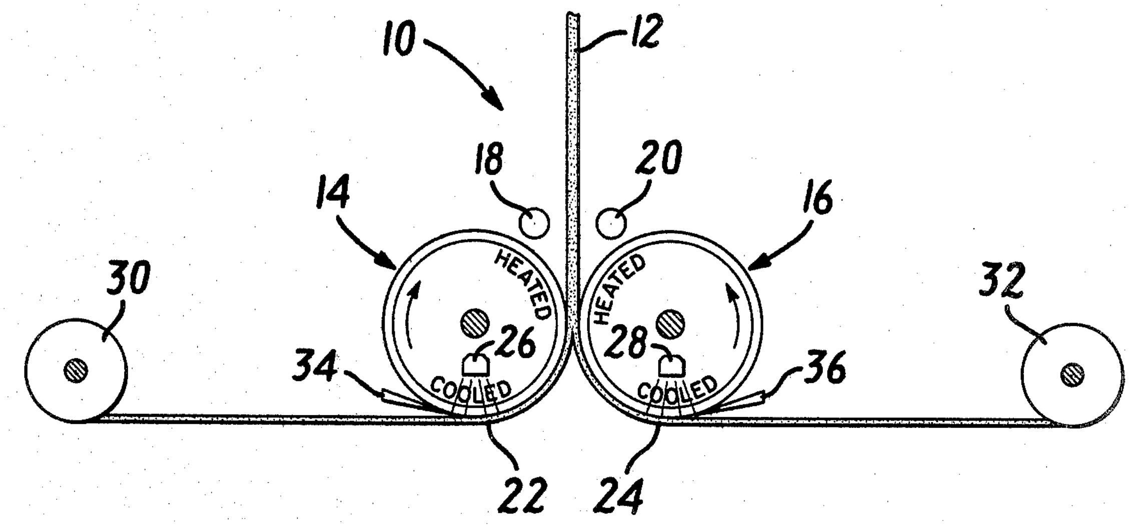
10
12
18
20
14
16
30
32
HEATED
HEATED
26
28
34
36
COOLED
COOLED
22
24

PROCESS FOR SPLITTING SHEET

The invention relates to a process for manufacturing a thermoplastic polymer sheet or a plastic net structure. In particular, it relates to a method and apparatus for splitting a previously manufactured thermoplastic polymer sheet or net structure into two parts through the approximate center of the previously manufactured product so as to form two sheets or net structures therefrom, as well as to products manufactured from structures made in accordance with the process.

While the present invention may be used with any type of sheet, it is particularly applicable to net-like structures, i.e. sheets having perforations therein. The invention will therefore be described in terms of a sheet of net.

Extrusion processes for manufacturing thermoplastic polymer sheets of net are well-known. In many cases, the minimum weight of the extruded product is limited because there is a minimum weight of material which must be extruded in order to satisfactorily form the sheet of net. In many instances it would be highly desirable to provide a sheet of net of a particular thermoplastic polymer material which would be of lighter weight than that provided by the conventional extrusion process. However, in the known prior art processes this has not been achievable.

There has now been discovered a process for making such lightweight sheets of nets. According to the invention, a thermoplastic polymer sheet of net is first formed by a conventional process such as that described in U.S. Pat. No. 3,252,181. The net is formed from a thermoplastic polymer such as polyamides, polyethylene terephthalate, polytetramethylene terephthalate, and the like. The net may be used directly as it comes from the extruder as in FIG. 1 of that patent or it may be cooled in conventional manner and then reheated. The previously formed net is first brought within a first range of temperatures at which the cohesive properties of the resin are poor and its adhesive properties to a selected surface are good.

The sheet of net at this temperature is placed between two smooth members having the selected surface. The surfaces are heated to hold the sheet of net at a temperature within said first temperature range. Preferably, successive portions of the sheet of net are heated and the heated portion is passed between a pair of large nip rolls and the temperature surface at the periphery of each of the nip rolls at the point of first contact being such as to maintain the resin in this said first temperature range.

The peripheral surface of the nip rolls must engage both sides of the sheet. Preferably the maximum applied pressure between the nip rolls will only minimally deform the resin sheet. The sides of the resin sheet adhere to the peripheral surface of the nip rolls and as the rolls simultaneously continue to rotate past the contact point, the sheet splits into two parts at approximately the center thereof.

The temperature at each side of the sheet will depend both upon the residual heat of the resin sheet as it passes between the rolls and the surface temperature of the rolls. The actual point of splitting of the resin sheet may be modified somewhat by controlling the temperature of the surfaces of the two rolls at the contact point. Preferably, the temperatures are maintained substantially equal but it is possible to split at other than the midpoint by proper differentials of temperature.

The actual temperature ranges required to reach the state of poor cohesion and good adhesion of the resin to the rolls must be determined empirically for each sheet of net according to the resin material employed, the thickness of the sheet, the roll surface, the linear speed of the net sheet and the time in contact with the rolls. The actual temperature to be used when taking these factors into account may be easily determined by one of ordinary skill in the plastic net art.

Each split half sheet is carried on the periphery of the rolls to a further point where it is subjected to a rapid cooling. It may be cooled by any conventional means, but preferably by a blast of frigid air either against an interior portion of the nip roll or exteriorly against the sheet and roll in order to reduce the temperature of the split sheet to the temperature range where its cohesive properties are again good and the adhesive properties of the resin to the roll surface are poor. At this time, the split sheet may be simply pulled from the nip roll, but preferably the sheet is scraped from the roll by means such as a conventional doctor knife.

Thus, according to the invention, there is provided a process and apparatus for reducing the weight of previously weight-limited sheets and net structures. It will be appreciated that the process may be utilized again for the previously split sheet if an even lighter weight sheet of net is desired.

Further features and advantages of the process and apparatus according to the invention will be seen in conjunction with the description of the FIGURE detailing the best mode contemplated by the inventor.

In the FIGURE, apparatus according to the invention is schematically illustrated at 10. A plastic net 12, comprising a polyamide resin is fed so as to pass between a pair of large nip rolls, or calendering assembly, 14 and 16. The rolls 14 and 16 have smooth steel surfaces and are preferably mirror finished with a chrome plating. Infrared heaters 18 and 20 are disposed on each side of the net 12 just above the rolls 14 and 16 for heating the adjacent portions of the net 12 if necessary. The peripheries of the rolls 14 and 16 are heated by heaters 18 and 20. Alternatively other means of heat such as a natural gas heater or forced hot air may be utilized if desired.

The rolls 14 and 16 rotate in opposed directions. The infrared heaters 18 and 20 are arranged and have such thermal output that the net 12 is heated to the temperature at which the polyamide of which it is composed has poor cohesion and good adhesion to the chromed surface of the rolls. A suitable temperature for nylon 6/6 is between 280° F. and 300° F. At this temperature, the opposed faces of the net 12 adhere to the heated peripheral surface of each of the rolls 14 and 16. As the rolls rotate further, the net 12 divides at approximately the midpoint thereof, each split portion 22 and 24 adhering to and traveling with the periphery of its roll.

After being carried by the rotation of the rolls to a further point, the split portions 22 and 24 on the surface of the rolls 14 and 16 are subjected to a sudden temperature drop. One means for providing such a temperature drop is a pair of ducts 26 and 28 which provide a frigid air blast for cooling the surfaces of the rolls 14 and 16 and thus the split portions 22 and 24 to the temperature range where the cohesion properties of the polyamides are again good and the adhesion characteristics to the roll surface are poor. For the polyamide resin of this example, a temperature drop of about 20°–25° C. has been found to give excellent results.

The net may be subsequently pulled off the nip rolls 14 and 16 by tension from the takeup roll 30 and 32 illustrated. Preferably, however, doctor knives 34 and 36 are disposed against the surface of the rolls 14 and 16 for the purpose of aiding in removing the now substantially non-adhering split portions 22 and 24 from the periphery of the rolls 14 and 16.

It will be understood that various changes and modifications can be made to the present invention without departing from the spirit and scope thereof. It will therefore be further understood that the applicant is to be limited by his claims and not by the specific embodiment chosen herein for the purpose of illustration.

What is claimed is:

1. A continuous method for splitting a unitary sheet of thermoplastic polymer net by contacting it with opposed, continuously moving heated surfaces comprising the steps of:

(a) heating a sheet of thermoplastic polymer net to a first temperature range wherein said thermoplastic polymer has poor cohesive properties and good adhesive properties with said surfaces;

(b) feeding the opposed faces of said sheet of thermoplastic polymer net between said opposed, continuously moving heated surfaces, said opposed surfaces being heated to a degree sufficient to maintain the temperature of said sheet within said first temperature range, and said heated surfaces moving at substantially the same rate as said sheet whereby said faces adhere to said opposed surfaces and said surfaces moving in a direction parallel to the opposed faces of the said net.

(c) moving said opposed surfaces away from each other to split said sheet of thermoplastic polymer net along a plane substantially parallel to the plane of the surface of the sheet to thereby form sheet parts, each said sheet part continuing to adhere to the surface with which it is in contact;

(d) reducing the temperature of each said sheet part to a temperature range wherein said sheet part is self-supporting and exhibits poor adhesive properties with said surface with which it is in contact;

(e) and removing the sheet parts from the said surface.

2. The method of claim 1 wherein said opposed surfaces are the surfaces of an opposed pair of rolls.

3. The method of claim 2 wherein the step of reducing the temperature of each said sheet part is accomplished by cooling a portion of the periphery of said rolls.

4. The method of claim 1 wherein said thermoplastic polymer is a polyamide and said sheet is heated to a temperature in the temperature range between 280° F. and 300° F.

5. A continuous process for splitting a continuously moving, self-supporting thermoplastic polymer sheet to produce two continuous sheet structures therefrom, each of said sheet structures having a width of substantially one half the width of the thermoplastic polymer sheet, comprising the steps of heating a previously formed thermoplastic polymer sheet structure to a temperature within a predetermined first range of temperatures wherein the resin of the thermoplastic polymer sheet exhibits good adhesive properties and poor cohesive properties; feeding the still heated continuously moving thermoplastic polymer sheet structure between a pair of rotating nip rolls, the surface of said nip rolls moving in a direction parallel to the opposed faces of the sheet said nip rolls being adapted to hold said continuously moving thermoplastic polymer sheet at a temperature within said first range of temperatures and wherein said sheet adheres to a periphery surface portion of each said nip roll, said continuously moving, self-supporting thermoplastic polymer sheet thereby dividing into two separate portions each adhering respectively to the periphery surface of each said nip roll; chilling said periphery portion of each of said rolls as it reaches another point thereafter, whereby the temperature of each said portion is reduced to a temperature within the temperature range wherein the resin of said thermoplastic polymer sheet exhibits good cohesive properties and poor adhesive properties to the surfaces of said nip rolls; and thereafter removing the two continuously moving, self-supporting split thermoplastic polymer sheets from the periphery of the nip rolls.

6. A continuous process for splitting a unitary, self-supporting thermoplastic polymer sheet having perforations therein to produce two self-supporting lightweight plastic net structures therefrom comprising the steps of heating a previously formed self-supporting thermoplastic polymer net structure to a temperature within a predetermined first range of temperatures wherein the resin of the thermoplastic polymer net exhibits good adhesive properties and poor cohesive properties; feeding the still heated thermoplastic polymer net structure between a pair of continuously rotating nip rolls, said nip rolls being heated to a degree sufficient to maintain said thermoplastic polymer net structure at a temperature within said first range of temperatures and wherein said resin adheres to a periphery surface portion of each said nip roll, thereby causing the thermoplastic polymer net structure to move continuously at substantially the same rate as the nip rolls, said thermoplastic polymer net thereby dividing into two separate portions each adhering respectively to the periphery surface of each said continuously moving nip roll; chilling said periphery portion of each of said rolls as it reaches another point thereafter wherein the temperature of each said portion is reduced to a temperature within the temperature range wherein the resin of said thermoplastic polymer net exhibits good cohesive properties and poor adhesive properties; and thereafter removing the self-supporting split thermoplastic polymer net from the periphery of the rolls.

7. Apparatus for splitting a continuously moving, self-supporting thermoplastic polymer net sheet to produce two net sheet structures therefrom, each of said structures having substantially one-half the width of said continuously moving, self-supporting thermoplastic net sheet, comprising:

(a) a pair of nip rolls each of said rolls having a peripheral surface;

(b) means for moving said rolls in opposed direction;

(c) means for heating a first portion of said pair of rolls before they reach the point of osculation;

(d) means for chilling a second portion of the peripheral surface of each of said pair of rolls after they pass through the point of osculation; and (e) doctor blades against the periphery of each roll positioned rotationally past the means for chilling.

* * * * *